US012696269B2

(12) United States Patent
Abdelghaffar et al.

(10) Patent No.: US 12,696,269 B2
(45) Date of Patent: Jul. 28, 2026

(54) AVAILABLE SLOT COUNTING FOR SLOTS WITH SBFD AND NON-SBFD SYMBOLS

(71) Applicant: QUALCOMM Incorporated, San Diego, CA (US)

(72) Inventors: Muhammad Sayed Khairy Abdelghaffar, San Jose, CA (US); Yan Zhou, San Diego, CA (US); Qian Zhang, Basking Ridge, NJ (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 18/448,021

(22) Filed: Aug. 10, 2023

(65) Prior Publication Data

US 2025/0056531 A1 Feb. 13, 2025

(51) Int. Cl.
| | |
|---|---|
| *H04W 4/00* | (2018.01) |
| *H04L 1/08* | (2006.01) |
| *H04W 72/1268* | (2023.01) |

(52) U.S. Cl.
CPC ........... *H04W 72/1268* (2013.01); *H04L 1/08* (2013.01)

(58) Field of Classification Search
USPC ................................................ 370/329, 330
See application file for complete search history.

(56) References Cited

U.S. PATENT DOCUMENTS

2023/0232406 A1* 7/2023 Ouchi ................. H04L 27/2602
                                                          370/329
2023/0247638 A1* 8/2023 Ouchi ............... H04W 72/1268
                                                          370/329

(Continued)

OTHER PUBLICATIONS

Huawei, et al., "Discussion on Potential Enhancement on Subband Non-overlapping Full Duplex", 3GPP TSG-RAN WG1 Meeting #113, R1-2304647, 3rd Generation Partnership Project (3GPP), Mobile Competence Centre, 650, Route Des Lucioles, F-06921 Sophia-Antipolis Cedex, France, vol. RAN WG1, No. Incheon, Korea, May 22, 2023-May 26, 2023, May 15, 2023, 26 Pages, XP052385180, pp. 7, 8.

(Continued)

*Primary Examiner* — Chuong T Ho
(74) *Attorney, Agent, or Firm* — Patterson & Sheridan LLP

(57) ABSTRACT

Certain aspects of the present disclosure provide techniques for available slot counting for slots with subband full duplex (SBFD) and non-SBFD symbols. An example method, performed at a user equipment (UE), generally includes receiving an indication of whether available slot counting is enabled when the UE is configured to transmit or receive multiple repetitions on at least one physical channel, receiving signaling scheduling the UE to transmit or receive multiple repetitions on the at least one physical channel, wherein at least one of the repetitions is scheduled to occur in at least one slot that has multiple different types of symbols within that slot, and processing one or more repetitions on the physical channel, based on the indication and signaling, wherein the processing involves performing available slot counting and determining whether to transmit or receive a repetition on the physical channel in the at least one slot.

30 Claims, 14 Drawing Sheets

(56) References Cited

U.S. PATENT DOCUMENTS

| | | | | |
|---|---|---|---|---|
| 2023/0254075 | A1* | 8/2023 | Cozzo | H04W 72/0446 |
| 2023/0254829 | A1* | 8/2023 | Xiong | H04L 1/1861 |
| | | | | 370/329 |
| 2023/0276438 | A1* | 8/2023 | Rudolf | H04W 52/245 |
| 2023/0292294 | A1* | 9/2023 | Rudolf | H04L 5/0053 |
| 2024/0014995 | A1* | 1/2024 | Chatterjee | H04L 5/0046 |
| 2024/0097866 | A1* | 3/2024 | Nemeth | H04L 5/1469 |
| 2025/0159664 | A1* | 5/2025 | Jiang | H04L 5/001 |

OTHER PUBLICATIONS

International Search Report and Written Opinion—PCT/US2024/031290—ISA/EPO—Aug. 16, 2024.
Nokia, et al., "On Subband Non-overlapping Full Duplex for NR", 3GPP TSG RAN WG1 #113, R1-2305397, 3rd Generation Partnership Project (3GPP), Mobile Competence Centre, 650, Route Des Lucioles, F-06921 Sophia-Antipolis Cedex, France, vol. RAN WG1, No. Incheon, Korea, May 22, 2023-May 26, 2023, May 15, 2023, 52 Pages, XP052385727, pp. 21-24.
QUALCOMM Incorporated: "Feasibility and Techniques for Subband Non-overlapping Full Duplex", 3GPP TSG RAN WG1, Meeting #113, R1-2305335, 3rd Generation Partnership Project (3GPP), Mobile Competence Centre, 650, Route Des Lucioles, F-06921 Sophia-Antipolis Cedex, France, vol. RAN WG1, No. Incheon, Korea, May 22, 2023-May 26, 2023, May 21, 2023, 68 Pages, XP052394169, pp. 29, 33-3.

* cited by examiner

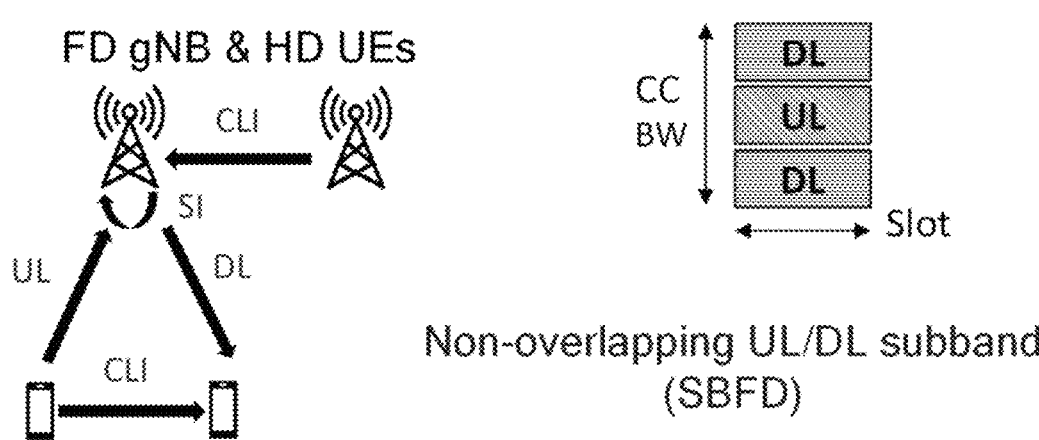
FD gNB & HD UEs
Non-overlapping UL/DL subband (SBFD)
FIG. 6A
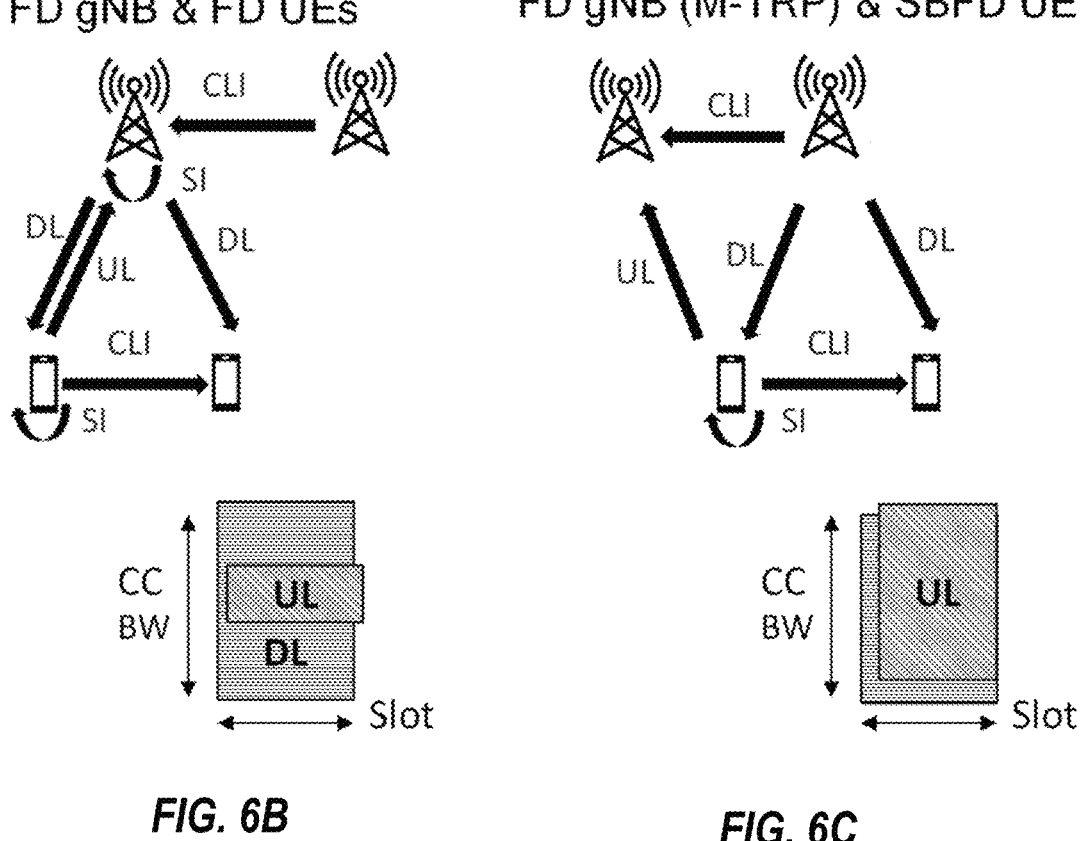
FD gNB & FD UEs
FD gNB (M-TRP) & SBFD UE
FIG. 6B
FIG. 6C 700
702
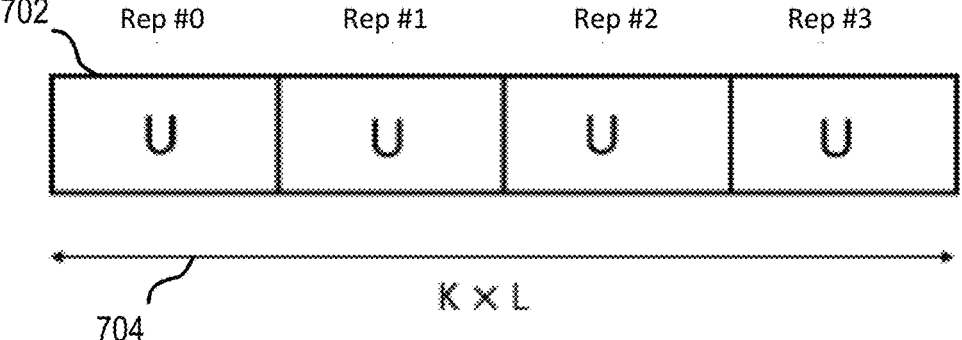
704
FIG. 7
800
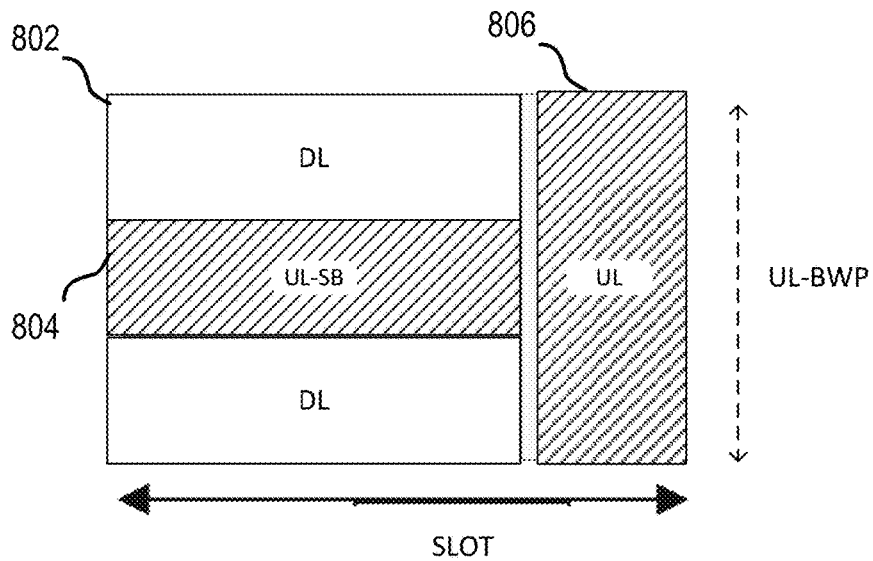
FIG. 8A

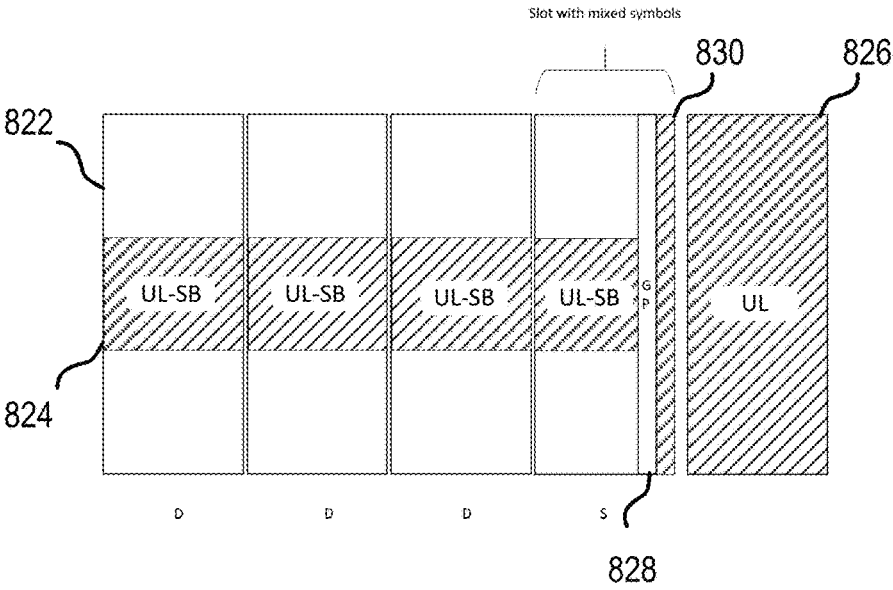
FIG. 8B
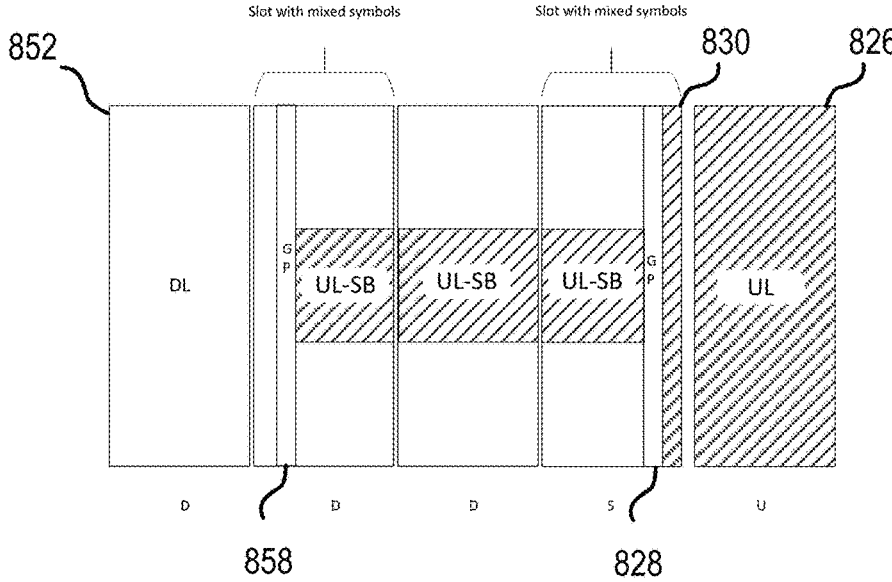
FIG. 8C

1000

1004

Slot with mixed symbols is considered as non-available and not counted (no Tx/Rx)

1050

1054

Slot with mixed symbols is considered as available and is counted (but Tx/Rx is dropped)

1100

1104

Slot with mixed symbols
is considered as
available and is counted
as a repetition

1150

1154

Slot with mixed symbols
is considered as
available and is counted
as a repetition

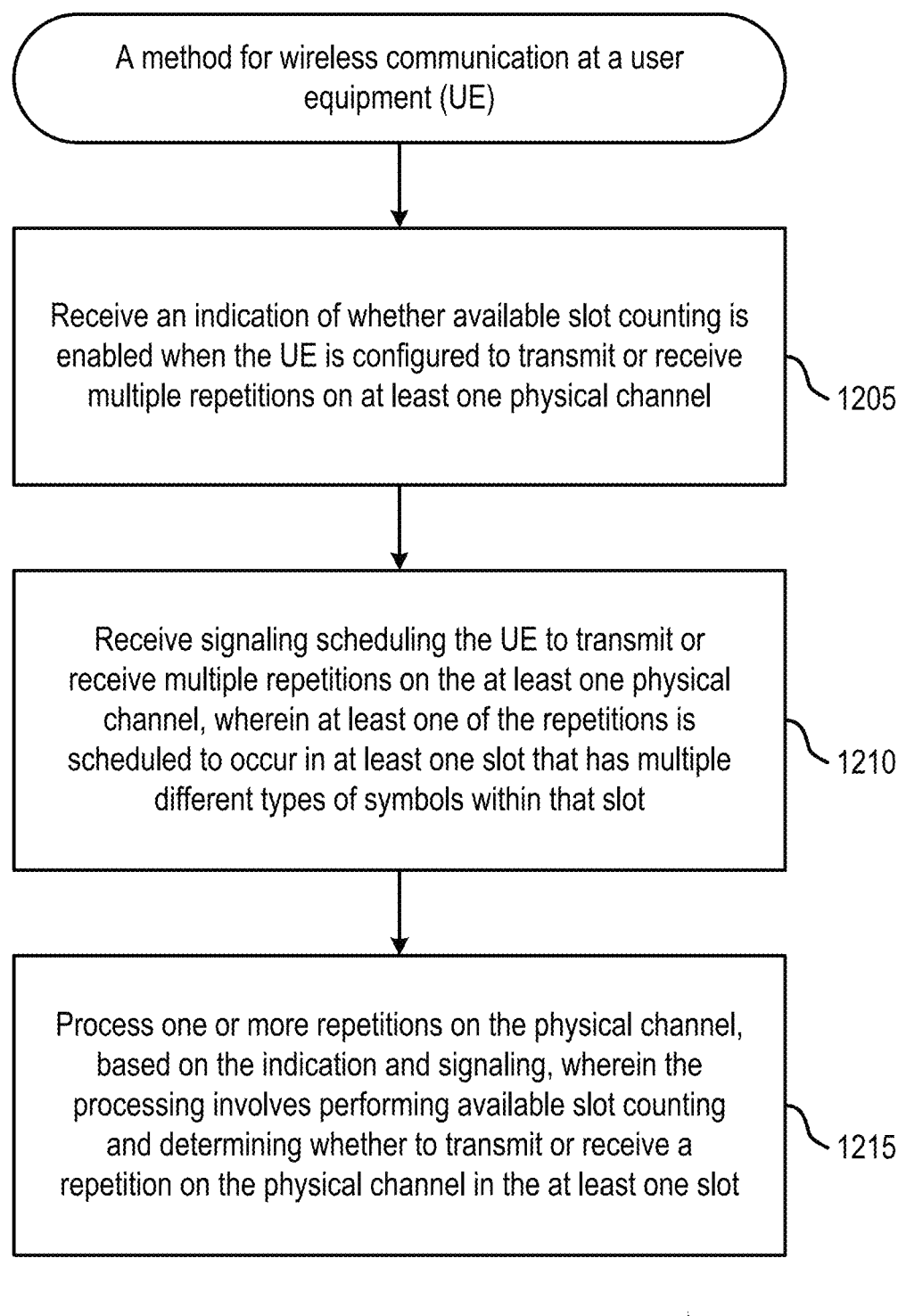

A method for wireless communication at a user equipment (UE)

Receive an indication of whether available slot counting is enabled when the UE is configured to transmit or receive multiple repetitions on at least one physical channel

1205

Receive signaling scheduling the UE to transmit or receive multiple repetitions on the at least one physical channel, wherein at least one of the repetitions is scheduled to occur in at least one slot that has multiple different types of symbols within that slot

1210

Process one or more repetitions on the physical channel, based on the indication and signaling, wherein the processing involves performing available slot counting and determining whether to transmit or receive a repetition on the physical channel in the at least one slot

Network
Interface

1460

1455

Transceiver

1405

Processing System

1450

1410

Processor(s)

1415

Circuitry for Receiving

1420

Circuitry for Processing

1425

Circuitry for Transmitting

1430

Computer-Readable Medium/
Memory

1435

Code for Receiving

1440

Code for Processing

1445

Code for Transmitting

AVAILABLE SLOT COUNTING FOR SLOTS WITH SBFD AND NON-SBFD SYMBOLS

BACKGROUND

Field of the Disclosure

Aspects of the present disclosure relate to wireless communications, and more particularly, to techniques for available slot counting for slots with subband full duplex (SBFD) and non-SBFD symbols.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication at a user equipment (UE). The method includes receiving an indication of whether available slot counting is enabled when the UE is configured to transmit or receive multiple repetitions on at least one physical channel; receiving signaling scheduling the UE to transmit or receive multiple repetitions on the at least one physical channel, wherein at least one of the repetitions is scheduled to occur in at least one slot that has multiple different types of symbols within that slot; and processing one or more repetitions on the physical channel, based on the indication and signaling, wherein the processing involves performing available slot counting and determining whether to transmit or receive a repetition on the physical channel in the at least one slot.

Another aspect provides a method for wireless communication at a network entity. The method includes transmitting an indication of whether available slot counting is enabled when a user equipment (UE) is configured to transmit or receive multiple repetitions on at least one physical channel; transmitting signaling scheduling the UE to transmit or receive multiple repetitions on the at least one physical channel, wherein at least one of the repetitions is scheduled to occur in at least one slot that has multiple different types of symbols within that slot; and processing one or more repetitions on the physical channel, based on the indication and signaling, wherein the processing involves performing available slot counting and determining whether to transmit or receive a repetition on the physical channel in the at least one slot.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 5A, 5B, and 5C depict various examples of full duplex (FD) time/frequency resource configurations.

FIGS. 6A, 6B, and 6C depict various examples of full duplex configurations.

FIG. 7 depicts a physical uplink shared channel (PUSCH) transmission of a transport block (TB) over multiple repetitions.

FIGS. 8A, 8B, and 8C depict example slots with mixed (SBFD and non-SBFD) symbols.

FIG. 12 depicts a method for wireless communications.

DETAILED DESCRIPTION

Figure 1:
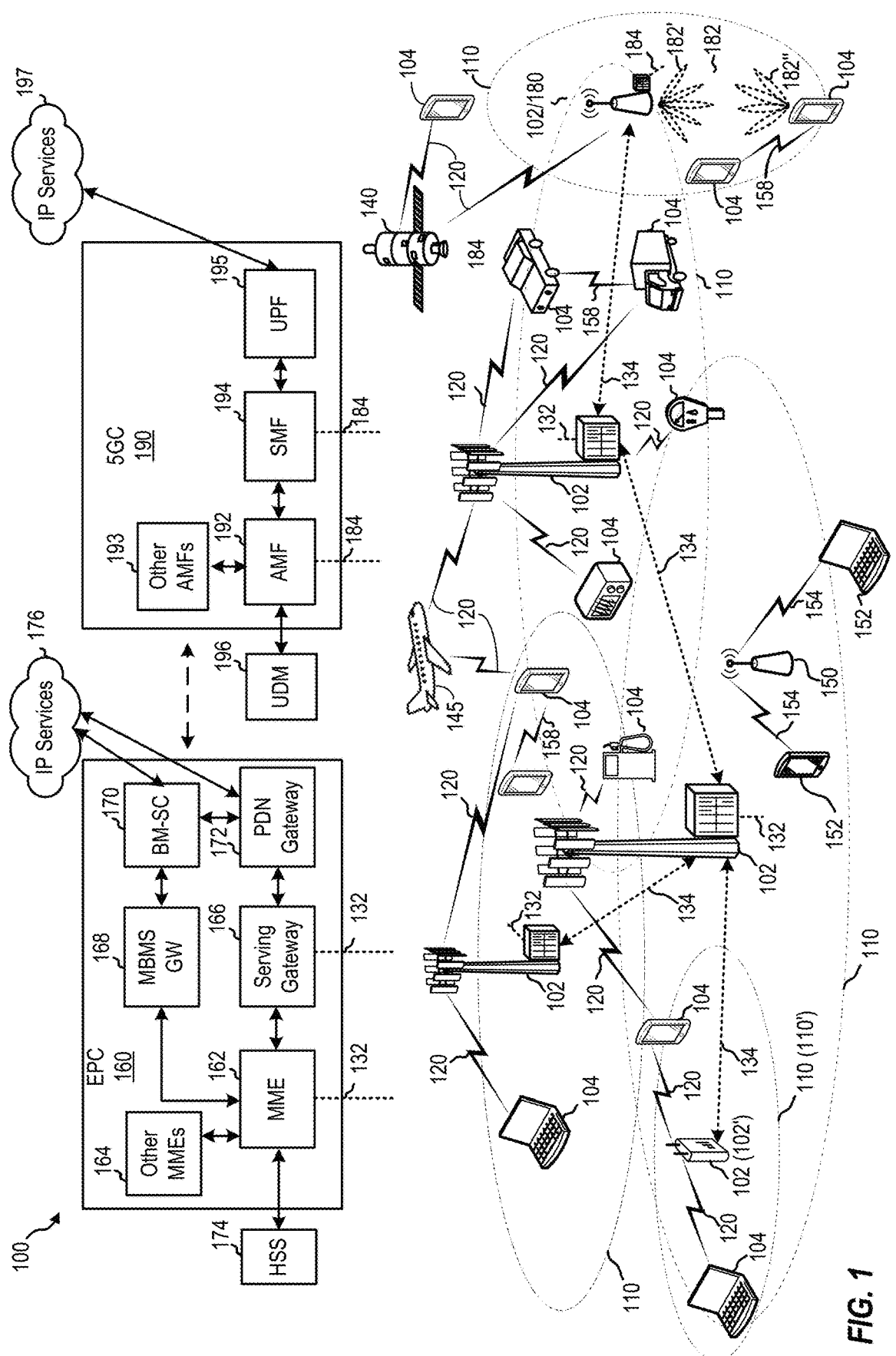
FIG. 1 depicts an example wireless communications network.

Aspects of the present disclosure provide apparatuses, methods, processing systems, and computer-readable mediums for available slot counting for slots with subband full duplex (SBFD) and non-SBFD symbols.

The term full duplex (FD) generally refers to simultaneous transmission and reception over a wireless medium. An FD device is, thus, capable of processing bi-directional transmissions at the same time. In contrast, a half-duplex (HD) device is only capable of transmitting or receiving, at one time, but not both.

If a user equipment (UE) is operating in HD mode and a network entity, such as a gNodeB (gNB), is operating in an FD mode, such as sub-band FD (SBFD) or in-band FD (IBFD), interference may occur at the UE and gNB from a number of sources. For example, this interference may include inter-cell interference (ICI) from other gNBs, intra-cell cross-link interference (CLI) from UEs in the same cell, and inter-cell CLI from UEs in adjacent cells. Self-interference may also occur for both FD UEs and FD gNBs. In the case of FD gNBs, for example, self-interference may refer to a downlink transmission interfering with reception of an uplink transmission. These sources of interference may cause significant issues, including decreased spectral efficiency, increased power consumption, and poor UE performance.

In SBFD communication, guard bands may be used to separate frequency resources allocated for downlink (DL) and uplink (UL) signaling. In SBFD, the downlink and uplink signals may be transmitted on different subbands within the same frequency band. The guard band is a portion of the spectrum that is not used for either downlink or uplink communication, but is instead reserved to separate the subbands used for downlink and uplink signaling, preventing interference between them and allowing for a more reliable and efficient use of the available spectrum.

In some cases, to enhance reliability and provide coverage enhancement (CE), certain physical (uplink and/or downlink) channels may be sent with repetition. In such cases, a certain number of repetitions may be configured and sent on what are considered available slots. A slot may be considered available, for example, if it has sufficient (uplink and/or downlink) symbols for transmission of the particular format of physical channel to be transmitted. Available slots are counted at the UE and network side so that both transmitter and receiver are in agreement, such that a transmitter knows when it is expected to transmit a repetition and a receiver can know when to monitor for a repetition.

Certain transmission time slots (slots) may have a mix of SBFD and non-SBFD symbols. One challenge with such mixed slots is how to determine, for physical channel repetitions, whether such slots with mixed SBFD and non-SBFD symbols should be considered as available slots (for counting purposes) and whether UE transmit the UL channel in that occasions.

Aspects of the present disclosure provide mechanisms that may help a network and UE determine when to count such mixed slots as available and/or whether to transmit and receive in such slots. The mechanisms may, thus, allow the UE and network to be in agreement, which may help avoid resource waste and help conserve power by monitoring for repetitions only when expected.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
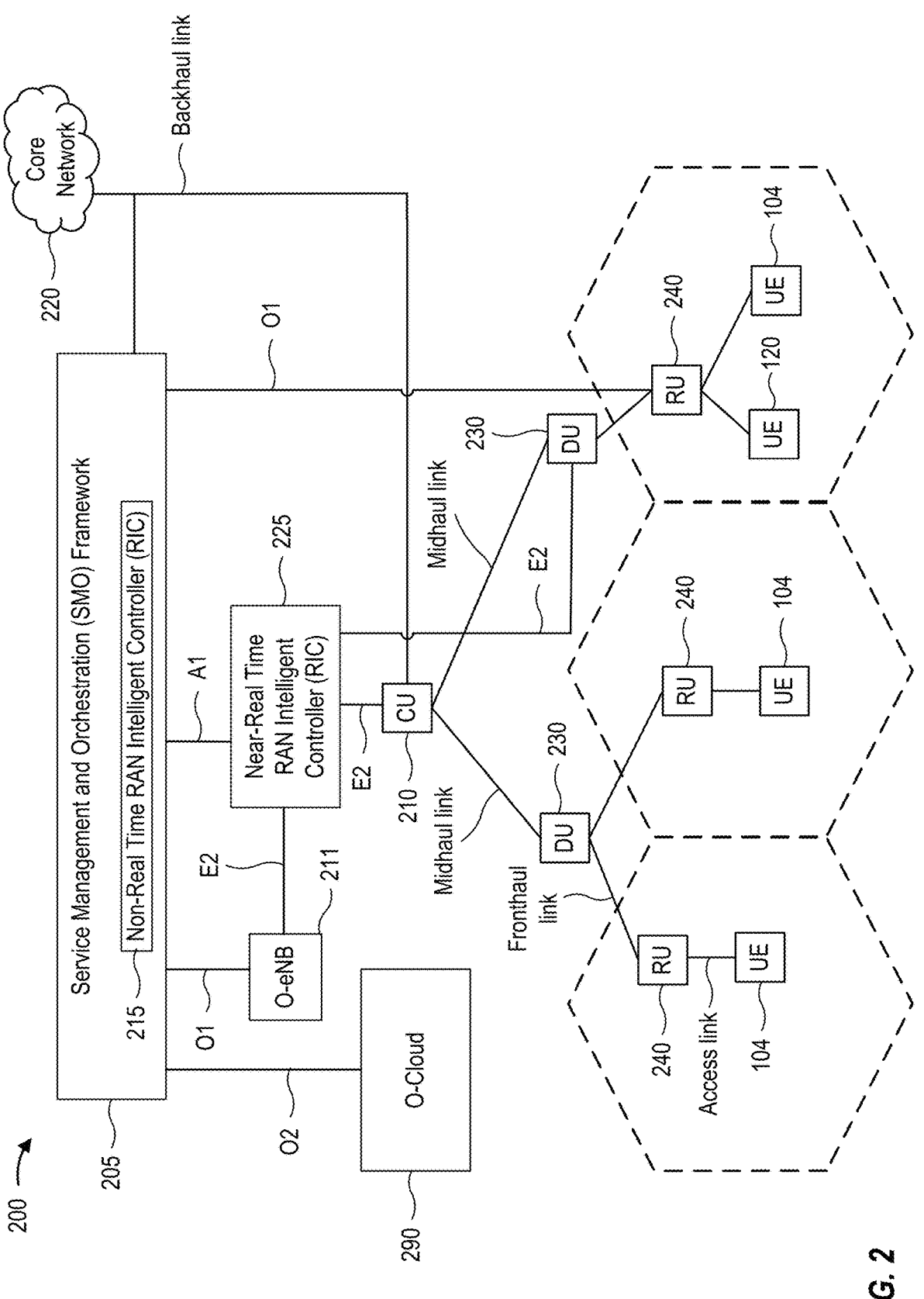
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHZ-52,600 MHZ, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182' BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration.

The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
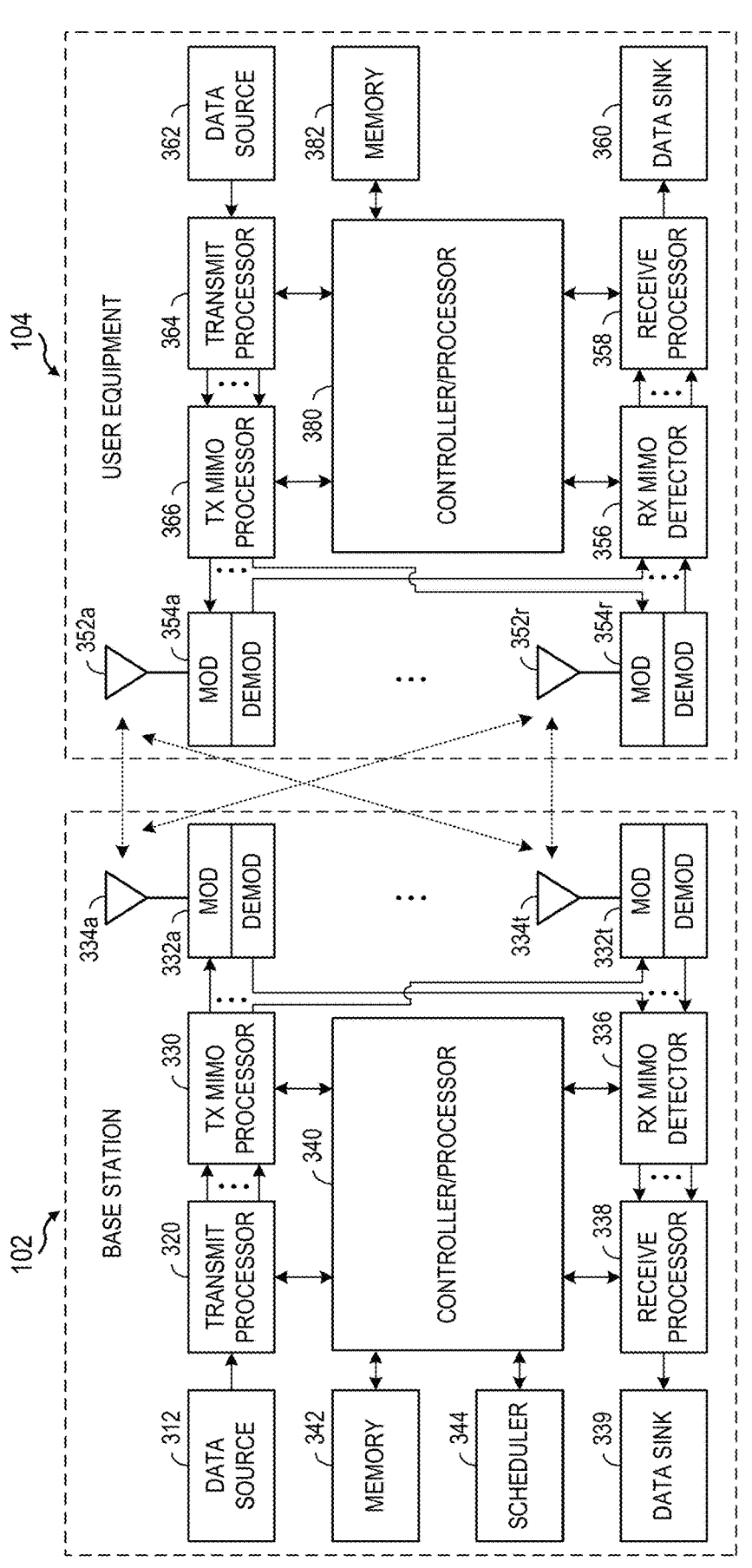
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
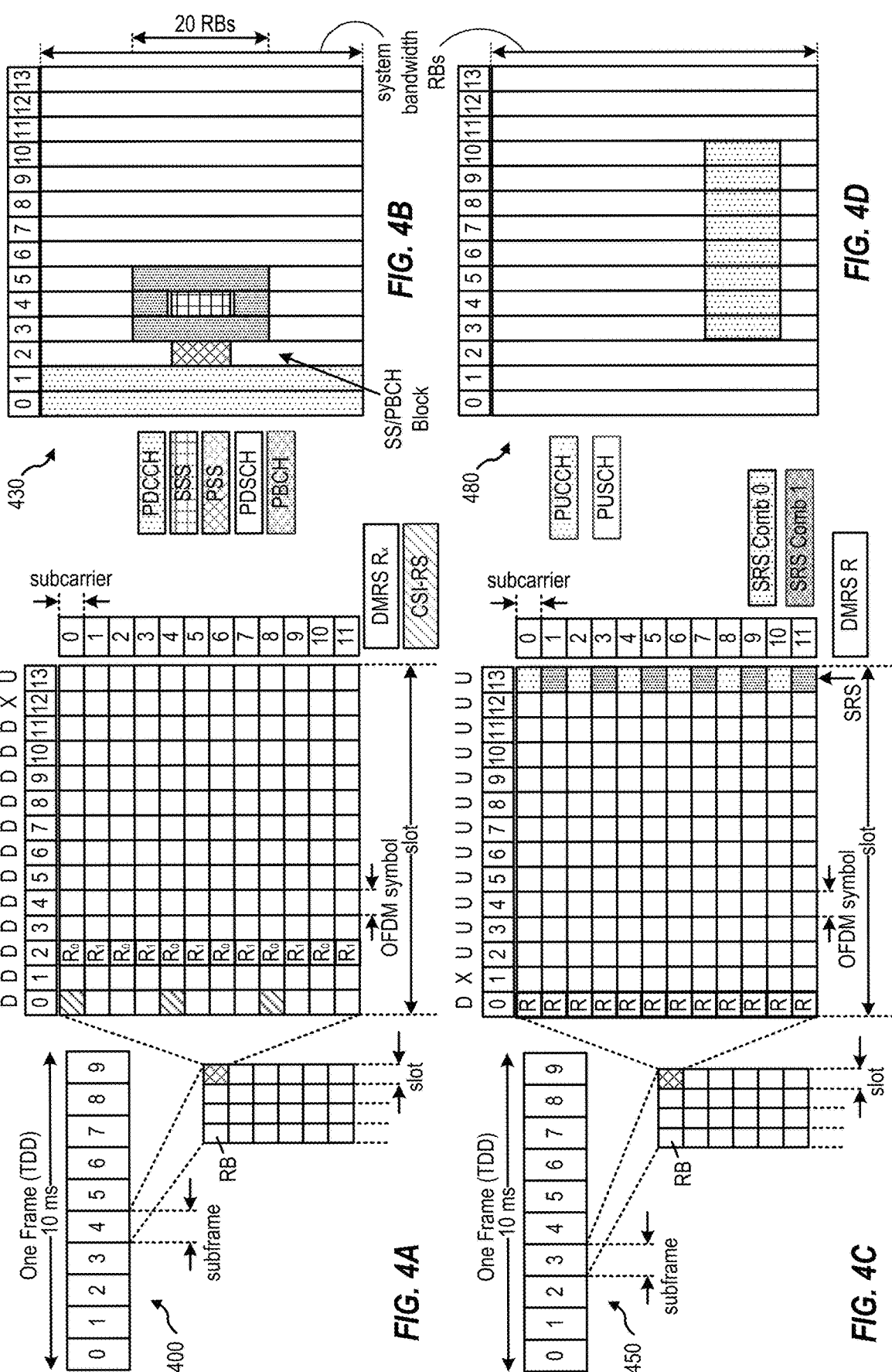
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semistatically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there arc 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Full Duplex Communication

As noted above, a full-duplex (FD) device is capable of simultaneous bi-directional communications. In contrast, half-duplex (HD) devices are only capable of communications in one direction (transmit or receive) at one time.

Figures 5A, 5B, 5C:
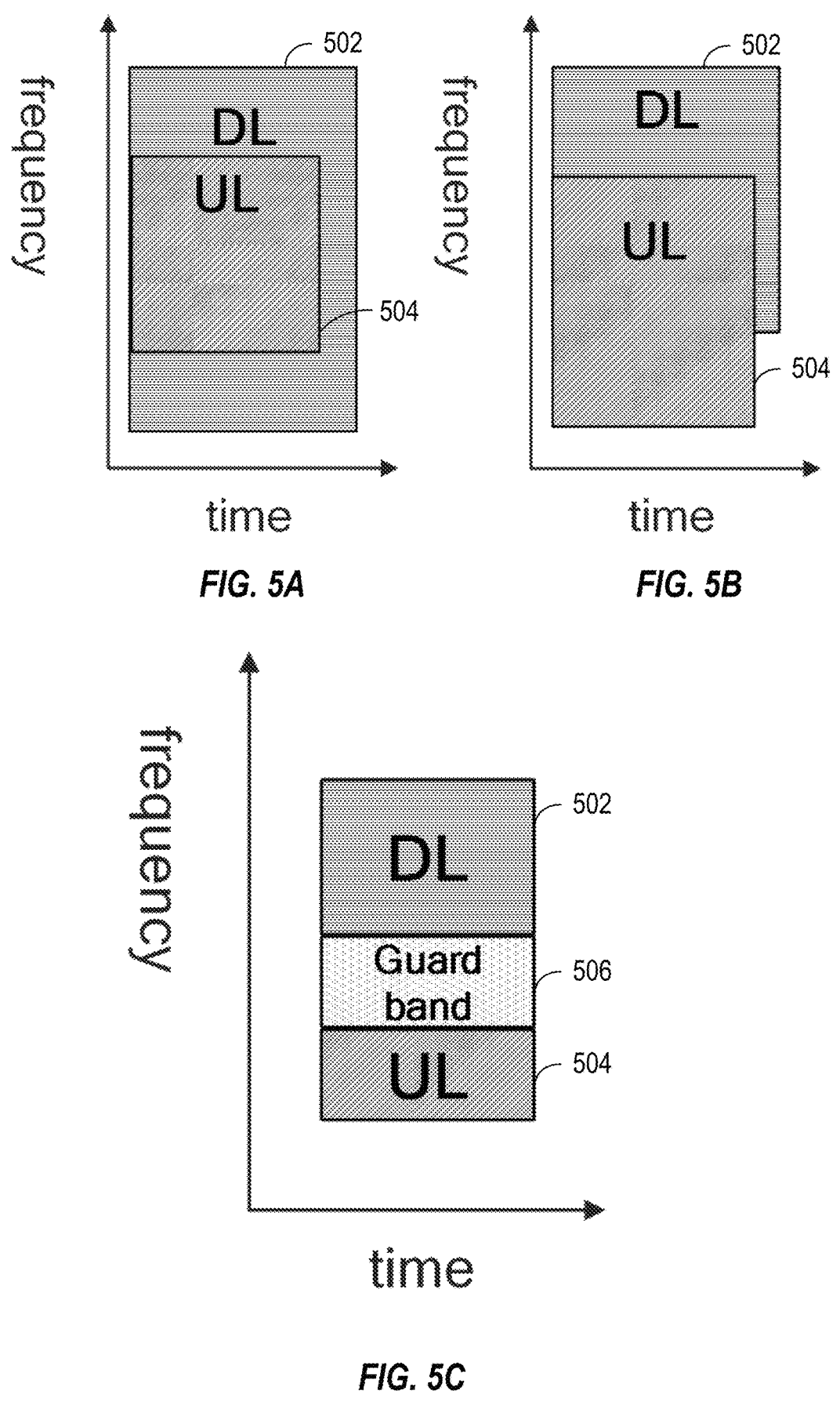

Examples of FD communication modes include in-band FD (IBFD) and sub-band FD. As illustrated in FIGS. 5A and 5B, with IBFD, a device may transmit and receive on the same time and frequency resources. In this case, the downlink (DL) 502 and uplink (UL) 504 shares the same IBFD time and frequency resources which may fully overlap (FIG. 5A) or partially overlap (FIG. 5B).

As shown in FIG. 5C, with SBFD (also referred to a flexible duplexing), a device may transmit and receive at the same time, but using different frequency resources. In this case, the DL resource may be separated from the UL resource, in frequency domain, by a guard band 506.

Interference to a UE and/or a network entity (e.g., a base station such as a gNB or node of a disaggregated base station) operating in FD mode may come in the form of CLI from neighboring nodes, as well as self-interference (SI). FIG. 5A, FIG. 5B, FIG. 5C, and FIG. 5D illustrate example interference scenarios for various FD communication use cases.

As illustrated in FIG. 6A, a first scenario is when FD is enabled for a gNB (e.g., with non-overlapping UL/DL subbands) but disabled for each connected UE (which in turn may be enabled for half-duplex (HD) communication), a gNB communicates using FD capabilities. In this case, CLI between UEs, SI from the FD gNB, and CLI between the gNB and neighboring gNBs interferes with FD communication.

As illustrated in FIG. 6B, a second scenario is when FD is enabled for both a gNB and a FD UE/customer premise equipment (CPE) connected to the gNB, the gNB communicates with the FD UE using FD capabilities. If the gNB is connected to a HD UE alongside the FD UE, the gNB communicates with the HD UE. In this case, CLI between UEs, SI from the gNB and the FD UE, and CLI between the FD gNB and neighboring gNBs interferes with FD communication.

As illustrated in FIG. 6C, a third scenario is when FD is enabled for two gNBs (e.g., in a multiple TRP scenario) and enabled at one UE/CPE connected to the two gNBs. In this case, the two gNBs may communicate with the FD UE using FD capabilities. If one of the two gNBs is connected to an HD UE alongside the FD UE, the one gNB communicates with both the HD UE and the FD UE. In this case, CLI between UEs, SI from the FD UE, and CLI between the two gNBs may interfere with FD communication.

Overview of Repetition

As noted above, to enhance reliability and provide coverage enhancement (CE), certain physical (uplink and/or downlink) channels may be sent with repetition. In such cases, a certain number of repetitions may be configured and sent on what are considered available slots.

FIG. 7 shows an example 700 for physical uplink shared channel (PUSCH) transmission of a transport block (TB) over multiple repetitions 702. In such cases, time domain resources may be indicated for the first repetition (Rep #0), while time domain resources for the remaining repetitions (Reps #1-3) may be derived based on the time domain resources for the first repetition and uplink/downlink direction of symbols in the slots. As indicated, the number of valid symbols for PUSCH transmission the TB are in a time window K×L, where K is the number of repetitions (4 in this example), L is the length of a repetition (e.g., in symbols).

There are different types of PUSCH repetition, referred to as Type A and Type B. For Type A, each slot contains only one repetition and the time domain resource allocation (TDRA) for the repetitions of a transport block (TB) are the same in each slot. For Type B, the repetitions are conveyed in consecutive mini-slots so one slot might contain more than one repetition.

A slot may be considered available, for example, if it has sufficient (uplink and/or downlink) symbols for transmission of the particular format of physical channel to be transmitted. Available slots are counted at the UE and network side so that both transmitter and receiver are in agreement, such that a transmitter knows when it is expected to transmit a repetition and a receiver can know when to monitor for a repetition.

For example, PUCCH repetition may be based on available slot counting from a reference slot that is determined based on RRC parameters (e.g., P-PUCCH for SR or CSI-Reporting) or determined by K1 from triggering DCI (for Ack/Nack (A/N) PUCCH). If a UE determines that, for a repetition of a PUCCH transmission in a slot, the number of symbols available for the PUCCH transmission is smaller than a value provided by a parameter (nrofSymbols) for the corresponding PUCCH format, the UE may be configured to refrain from transmitting the PUCCH repetition in the slot. Dynamic grant (DG) PUSCH repetition can either based on available slot counting or based on consecutive physical slots.

Aspects Related to Available Slot Counting for Slots with SBFD and Non-SBFD Symbols As noted above, certain transmission time slots (slots) may have a mix of SBFD and non-SBFD symbols. One challenge with such mixed slots is how to determine, for physical channel repetitions, whether such slots with mixed SBFD and non-SBFD symbols should be considered as available slots (for counting purposes) and whether UE transmit the UL channel in that occasions.

FIG. 8A depicts an example mixed slot 800 with SBFD and non-SBFD symbols. As illustrated, the SBFD symbols include downlink subbands (DL-SB) 802 and an uplink subband (UL-SB) 804. The non-SBFD symbol is an UL symbol with frequency resources spanning an uplink bandwidth part (UL-BWP).

It is possible that a transmission/reception occasion of a physical channel/signal may be mapped to SBFD and non-SBFD symbols within a slot for a UE. Whether a UE is able to transmit/receive in the occasion mapped to SBFD symbols and non-SBFD symbols may depend on a variety of considerations.

One motivation for allowing that a slot can consist of both SBFD and non-SBFD symbols is for compatibility with symbol-level TDD UL/DL configuration. Frequent switching between SBFD and non-SBFD symbols, however, may increase the implementation complexity and interruptions of transmissions/receptions during transition. In some cases, a limitation on a maximum number of transition points (also referred to as switching points for transitioning/switching) between SBFD and non-SBFD symbols within a slot, a TDD UL/DL pattern period, and/or semi-static SBFD configuration period (if different from TDD UL/DL pattern period) may be considered.

FIGS. 8B and 8C depict examples 820 and 850 of a series of slots including transition points between SBFD and non-SBDF symbols (and/or between non-SBFD and SBDF symbols) within a slot. The examples include SBFD slots with DL-SBs 822 and UL-SB 824, a mixed slot, and a non-SBFD (UL) slot 826. As illustrated in FIG. 8B, the mixed slot of example 820 includes a guard period 828 that provides a transition between SBDF symbols and an UL symbol 830. As illustrated in FIG. 8C, the example 850 includes an additional mixed slot that includes a guard period 858 that provides a transition between a non-SBFD (DL) symbol 852 and SBFD symbols.

At least for semi-static SBFD configurations, in order to avoid frequent switching between SBFD and non-SBFD symbols, there may be a limitation on the maximum number of transition points (also referred to as switching points) between SBFD and non-SBFD symbols. For example, such a limitation may be implemented in an SBFD subband configuration. In some cases, for example, a maximum of two transition points, including one transition point from non-SBFD symbols to SBFD symbols and one transition point from SBFD symbols to non-SBFD symbols within a TDD UL/DL pattern period may be considered as a starting point where the transition point can be aligned with slot boundary or within a slot.

As described above, a guard period between SBFD and non-SBFD symbols may or may not be required at the network (e.g., gNB) and/or UE side, depending on gNB/UE implementation and/or SBFD operation. Aspects of the present disclosure provide various options for UE and network behavior for a physical channel/signal occasion mapped to SBFD and non-SBFD symbols within a slot.

As will be described below, depending on conditions or alternatives, a UE may not transmit or receive the physical channel/signal within a mixed slot or may only transmit or receive the physical channel/signal within a mixed slot only under certain conditions. Such conditions may depend on various factors, such as whether or not phase continuity can be maintained across SBFD and non-SBFD symbols, whether or not there are same or different transmission/reception parameters (e.g. power control, spatial/QCL, UL timing etc. applied in SBFD and non-SBFD symbols), and whether or not there is a guard period between the SBFD and non-SBFD symbols.

Aspects of the present disclosure provide mechanisms that may help a network and UE determine when to count such mixed slots as available and/or whether to transmit and receive in such slots. The mechanisms may, thus, allow the UE and network to be in agreement, which may help avoid resource waste and help conserve power by monitoring for repetitions only when expected.

Figure 9:
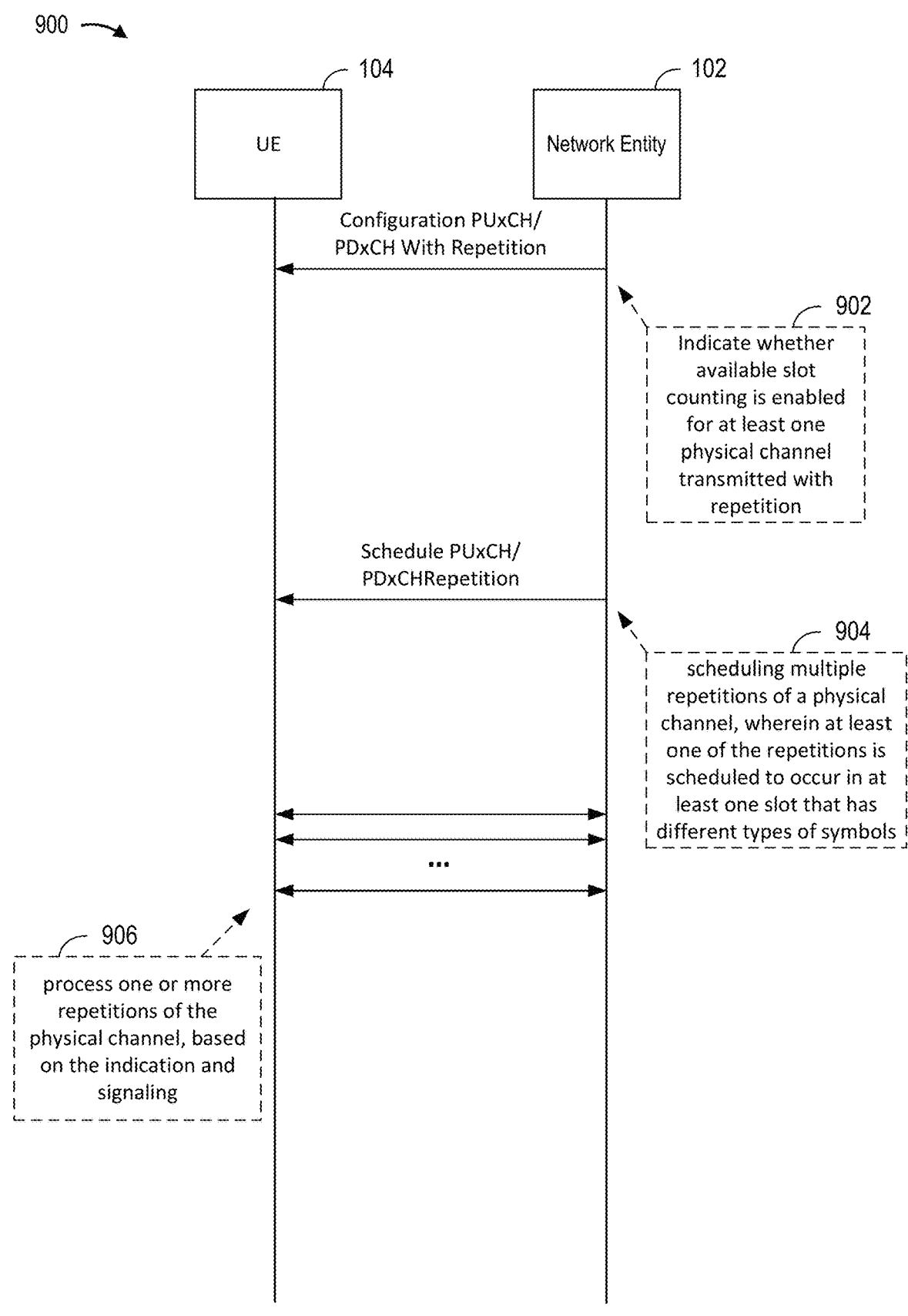
FIG. 9 depicts an example call flow diagram, in accordance with certain aspects of the present disclosure.

FIG. 9 depicts an example call flow diagram 1000 for processing physical channels mapped to mixed slots including SBFD and non-SBFD symbols, in accordance with certain aspects of the present disclosure. In some aspects, the UE shown FIG. 9 may be an example of the UE 104 depicted and described with respect to FIGS. 1 and 3. Similarly, the network entity may be an example of the BS 102 (e.g., a gNB) depicted and described with respect to FIGS. 1 and 3, an access point (AP), or a disaggregated base station depicted and described with respect to FIG. 2.

As illustrated at 902, the network entity configures the UE for a physical (UL/DL) channel with repetition, where the configuration indicates whether available slot counting is enabled.

As illustrated at 904, the network entity schedules multiple repetitions of a physical channel, wherein at least one of the repetitions is scheduled to occur in at least one slot that has different types of symbols (e.g., SBFD and non-SBFD).

As illustrated at 906, the UE processes one or more repetitions of the physical channel, based on the indication and signaling. While not shown, the network entity will perform corresponding processing, with available slot counting performed in a similar manner as the UE, so both transmitter and receiver are in-agreement on when to expect repetitions.

The processing may include, transmitting one or more repetitions of an uplink physical channel or receiving one or more repetitions of a downlink physical channel. Mixed slots, with SBFD and non-SBFD symbols, may be considered as available or unavailable depending on various considerations or implementations.

In the present disclosure, an uplink transmission may refer to a PUCCH or PUSCH transmission. For example, an uplink transmission may refer to a PUSCH repetition type A scheduled by DCI format 0_1 or 0_2 (DG-PUSCH) or a PUSCH transmission of a transport block (TB) processing over multiple slots scheduled by DCI format 0_1 or 0_2, which may be referred to as a dynamic grant TB over multiple slots (DG-TBoMS). An uplink transmission may also refer to a random access channel (RACH) procedure message, such as a Msg3/MsgA with repetitions scheduled by a random access response (RAR) UL grant or by DCI 0_0 scrambled by temporary cell radio network temporary identifier (TC-RNTI). An uplink transmission may also refer to Type 1 and Type 2 PUSCH transmission with configured grant (CG-PUSCH) and Type 2 PUSCH transmission of TBoMS with configured grant (CG-TBoMS).

Terms dropping and skipping may be used to refer to similar, but different, behavior. For example, skipping may refer to when available slot counting is enabled for PUSCH/PUCCH and the transmission occasion of the DG-UL or CG-UL in the slot is skipped (slot is not-available and not counted as a repetition). Dropping may refer to when physical slot counting is enabled, but the transmission occasion of the DG/CG-UL transmission in the slot is dropped (but the slot is counted as a repetition).

Figure 10A:
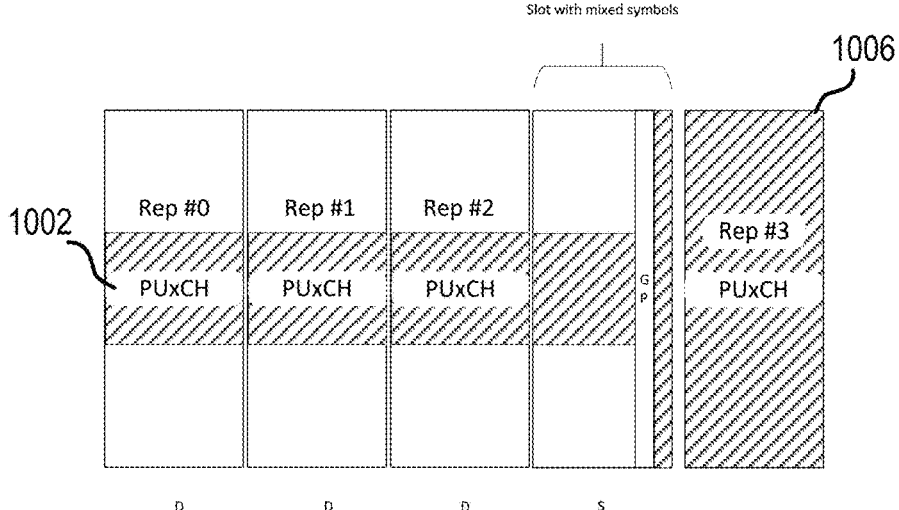
FIGS. 10A and 10B depict examples of available slot counting, in accordance with certain aspects of the present disclosure.
Figure 10B:
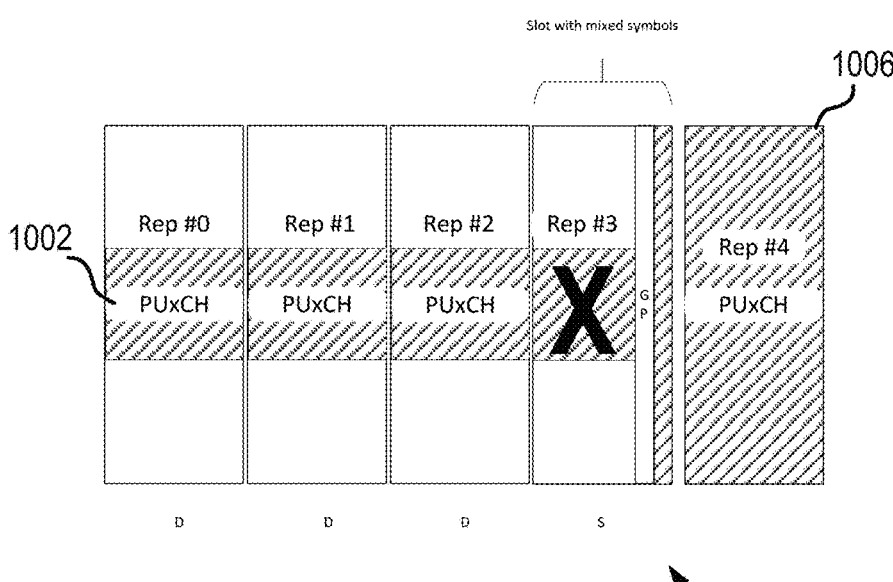

FIGS. 10A and 10B depict examples of available slot counting, in accordance with certain aspects of the present disclosure. The examples may apply when there is no physical mapping of a channel (allowed) in a mixed slot containing SBFD and non-SBFD symbols, with repetition based on available UL slot counting.

This may be the case, for example, in scenarios where a standard specification disallows mapping of a physical uplink channel across SBFD and non-SBFD symbols in a slot. In such cases the following approaches may be used for a PUCCH/PUSCH repetition (either triggered by DCI or configured repetition by RRC).

According to a first approach, when the time resources of a physical uplink channel are mapped across different symbols types (e.g., SBFD, non-SBFD, and/or guard symbol) in the slot and available-slot counting is enabled, then there are various alternatives.

One alternative is illustrated in example 1000 of FIG. 10A, where a physical uplink channel 1002 (PUCCH or PUSCH, shown generically as PUxCH) is scheduled by DCI or configured by RRC with repetition. As illustrated, at 1004, in this example, the mixed slot is considered as non-available and not counted (and there is no transmission or reception). As a result, the first 3 SBFD slots are counted as repetitions (Reps #0-#2), the mixed slot is not counted, but the subsequent UL slot 1006 is counted (Rep #3).

FIG. 10B illustrates an alternative approach in example 1050, in which the mixed slot is considered as available and counted (as Rep #3) as indicated at 1054, but transmission or reception is dropped (as indicated by the X). Thus, the repetition in UL slot 1006 is counted as Rep #4. These approaches shown in FIGS. 10A and 10B may be applicable for UL PUCCH and PUSCH repetition with available-slot counting enabled.

In some cases, repetition of the physical uplink or downlink channel may be based on consecutive physical slots. In such cases, there are various options for when mapping of a physical uplink channel across SBFD and non-SBFD symbols in a slot is disallowed.

According to one approach, for a PUCCH/PUSCH or PDSCH repetition (either triggered by DCI or configured repetition by RCC) in consecutive slots, when the time resources of a channel is mapped across both SBFD and non-SBFD symbols of the slot and available-slot counting is NOT enabled, then the UE drops the transmission or receptions and repetition in the slots. In some cases, the mixed slot may be counted. In other cases, the mixed slot may not be counted. This approach may be applicable for UL PUCCH and PUSCH repetition without available-slot Counting enabled and may be applicable for PDSCH repetition (Slot-Aggregation), which is applicable through consecutive slots.

In some cases, time domain resource allocation (TDRA) may be associated with SBFD only (or non-SBFD only) symbols. There are various options for processing repetitions when the time resources of an uplink channel are mapped to SBFD-only symbols (or non-SBFD symbols) of the slot with mixed symbols and available-slot counting is enabled. For example, one option is for the mixed slot to be considered as available and counted as a repetition. In this case, the UE may transmit the UL signal in the slot after applying a dropping rule for collisions if any (e.g., legacy behavior). Another option is for the mixed slot to be considered as unavailable and not-counted as a repetition. In this case, the UE may not transmit the UL signal in the slot.

There are also various options for when the time resources of a channel (PUCCH, PUSCH or PDSCH) are mapped to SBFD-only symbols (or non-SBFD symbols) of the slot with mixed symbols and available-slot counting is not enabled. According to a first option, the slot may be counted as a repetition. In this case, the UE may transmit the UL channel or receive the DL channel in the slot after applying the dropping rule for collisions-handling if any (e.g., legacy behavior). According to another option, the slot may not be counted as a repetition and, in such cases, the UE drops the uplink or downlink transmission. In other words, in this case, the UE does not transmit the UL channel in the slot or receive the DL channel.

Figure 11A:
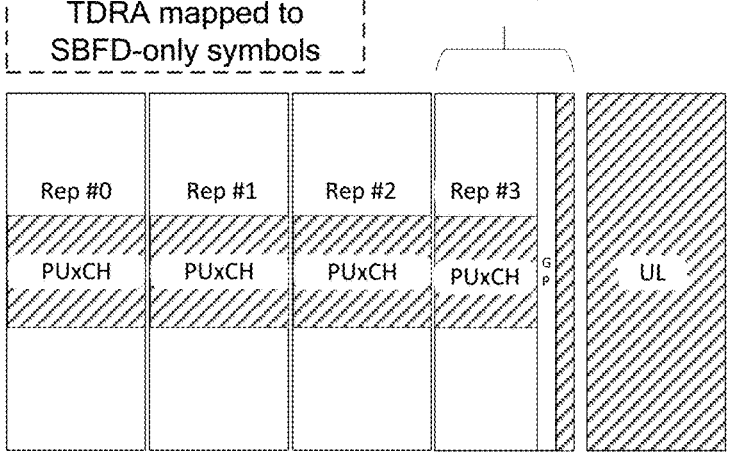
FIGS. 11A and 11B depict examples of available slot counting, in accordance with certain aspects of the present disclosure.
Figure 11B:
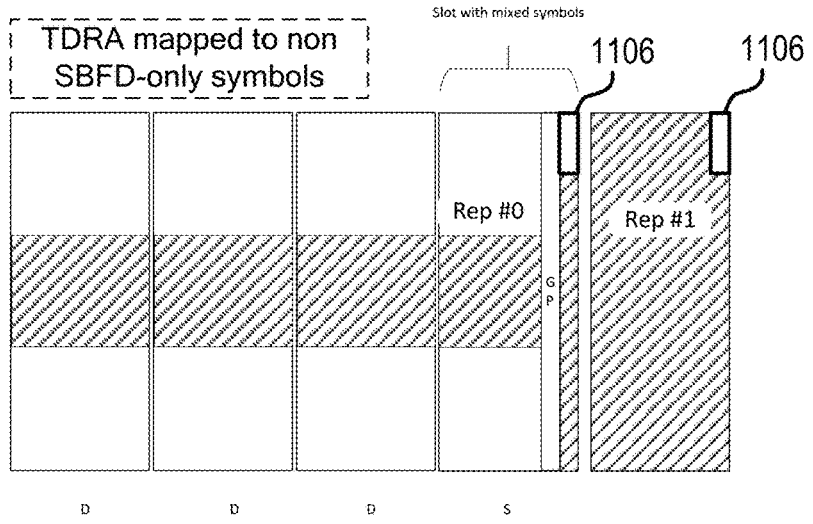

FIGS. 11A and 11B depict examples of various alternatives, in accordance with certain aspects of the present disclosure. The time domain symbols of the UL transmission (per TDRA) may be indicated as start symbols and number of symbols in relation to the UL-SB and UL slot locations in the slot.

In the example 1100 shown in FIG. 11A, the TDRA is mapped to SBFD-only symbols in the slot. In this example, as indicated at 1104, the slot with mixed symbols is considered as available and counted as a repetition.

In the example 1150 shown in FIG. 11B, the TDRA mapped to non SBFD-only symbols in the slot (as indicated at 1106). In this example, as indicated at 1154, the slot with mixed symbols is considered as available and counted as a repetition.

In scenarios when mapping of a physical channel to a mixed slot is allowed, there could be various conditions to consider the mixed slot as an available slot. For example, when mapping of a channel across SBFD and non-SBFD symbols in a slot, then for a PUCCH/PUSCH/PDSCH repetition (either triggered by DCI or configured repetition by RCC), whether the slot is counted may be based on whether such conditions are met or not.

For example, in such scenarios, a mixed slot may be considered as available for uplink transmission and counted towards the total number of repetition if one (or all) of the following conditions are met. These conditions may include phase continuity being maintained between SBFD and non-SBFD symbols, a same transmit power being maintained between SBFD and non-SBFD symbols, and same frequency resources in UL-SB and UL-slot being maintained. As an alternative, or in addition, these conditions may also include same spatial filter and QCL parameters being maintained between SBFD and non-SBFD symbols, same timing (no change of timing advance/adjustment TA) being maintained between SBFD and non-SBFD symbols, and there being no guard period between SBFD and non-SBFD symbols.

According to one option, the mixed slot may be considered as non-available if any one of the following conditions are not met. These conditions may include if there is guard period between SBFD and non-SBFD symbols in the slot, if there is variation of power and phase coherency, if there is intra-slot frequency hopping (FH), or if the gNB and/or UE explicitly indicate the slot as not available.

According to another option, a mixed slot may considered as available, but transmission is dropped if a condition not met. In some cases, this may result in transmission of all symbols being dropped. In other cases, this may result in only symbols after a transition point being dropped.

There are various options for scenarios where mapping of a physical channel is allowed in a mixed slot and the physical channel is scheduled for repetition based on consecutive physical slots. According to one approach, when the time resources of a physical uplink channel is mapped across both SBFD and non-SBFD symbols of the slot and physical counting is enabled (available slot counting not enabled/configured) then the slot is counted towards the repetitions, whether signal is transmitted/received or not.

According to one option, the signal may be transmitted/received in the slot if conditions are met regarding: phase continuity, same transmit power, same frequency resources in ULSB and UL slot, same spatial filter and quasi co-location (QCL) parameters, same timing (no change of TA), and/or no guard period. According to another option, the signal may be dropped/cancelled in the slot if at least one of such conditions is not met. According to still another option, the signal may be partially dropped (only partially transmitted), for example, with only symbols after the transition dropped.

Example Operations

FIG. 12 shows an example of a method 1200 of wireless communication at a user equipment (UE), such as a UE 104 of FIGS. 1 and 3.

Method 1200 begins at step 1205 with receiving an indication of whether available slot counting is enabled when the UE is configured to transmit or receive multiple repetitions on at least one physical channel. In some cases, the operations of this step refer to, or may be performed by, circuitry for receiving and/or code for receiving as described with reference to FIG. 14.

Method 1200 then proceeds to step 1210 with receiving signaling scheduling the UE to transmit or receive multiple repetitions on the at least one physical channel, wherein at least one of the repetitions is scheduled to occur in at least one slot that has multiple different types of symbols within that slot. In some cases, the operations of this step refer to, or may be performed by, circuitry for receiving and/or code for receiving as described with reference to FIG. 14.

Method 1200 then proceeds to step 1215 with processing one or more repetitions on the physical channel, based on the indication and signaling, wherein the processing involves performing available slot counting and determining whether to transmit or receive a repetition on the physical channel in the at least one slot. In some cases, the operations of this step refer to, or may be performed by, circuitry for processing and/or code for processing as described with reference to FIG. 14.

In some aspects, the processing comprises: transmitting one or more repetitions on an uplink physical channel; or receiving one or more repetitions on a downlink physical channel.

In some aspects, the different types of symbols in the at least one slot include a subband full duplex (SBFD) symbol and a non-SBFD symbol.

In some aspects, the signaling indicates that available slot counting is enabled; and time resources of the at least one of the repetitions are mapped across the different types of symbols in the at least one slot.

In some aspects, the processing comprises: considering the at least one slot as unavailable for processing a repetition on the physical channel in the at least one slot; or considering the at least one slot as available for processing a repetition on the physical channel in the at least one slot and counting the slot as a repetition, without transmitting or receiving a repetition on the physical channel in the at least one slot.

In some aspects, the processing comprises considering the at least one slot as available for processing a repetition on the physical channel in the at least one slot and counting the at least one slot as a repetition if one or more conditions are met.

In some aspects, the one or more conditions involve at least one of: maintaining at least one of phase continuity, transmit power, frequency resources, timing, spatial filtering, or quasi co-location (QCL) parameters across the different types of symbols; or lack of a guard symbol period across the different types of symbols.

In some aspects, the processing comprises considering the at least one slot as unavailable for processing a repetition on the physical channel in the at least one slot if one or more conditions are met.

In some aspects, the one or more conditions involve at least one of: variation of at least one of phase continuity or transmit power across the different types of symbols; occurrence of a guard symbol period across the different types of symbols; intra-slot frequency hopping; or signaling indicating the slot is unavailable for processing a repetition.

In some aspects, the processing comprises considering the at least one slot as available for processing a repetition, but not transmitting or receiving at least a portion of a repetition on the physical channel in the at least one slot, if one or more conditions are met.

In some aspects, the processing comprises not transmitting or receiving symbols that occur after a transition between the different types of symbols.

In some aspects, the signaling indicates that available slot counting is not enabled and repetitions are counted based on consecutive physical slot counting; time resources of the at least one of the repetitions are mapped across the different types of symbols in the at least one slot; and the processing comprises not transmitting or receiving a repetition on the physical channel in the at least one slot and counting the at least one slot as a repetition.

In some aspects, the signaling indicates that available slot counting is not enabled, and repetitions are counted based on consecutive physical slot counting; time resources of the at least one of the repetitions are mapped across the different types of symbols in the at least one slot; and the processing comprises not transmitting or receiving a repetition on the physical channel in the at least one slot and not counting the at least one slot as a repetition.

In some aspects, the signaling indicates that available slot counting is not enabled, and repetitions are counted based on consecutive physical slot counting; time resources of the at least one of the repetitions are mapped across the different types of symbols in the at least one slot; and the processing comprises transmitting or receiving a repetition on the physical channel in the at least one slot if some conditions are met and counting the at least one slot as a repetition.

In some aspects, the signaling indicates that available slot counting is not enabled, and repetitions are counted based on consecutive physical slot counting; time resources of the at least one of the repetitions are mapped across the different types of symbols in the at least one slot; and the processing comprises not transmitting or receiving the physical channel in the at least one slot if at least one conditions is not met and still counting the at least one slot as a repetition.

In some aspects, the signaling indicates that available slot counting is not enabled, and repetitions are counted based on consecutive physical slot counting; time resources of the at least one of the repetitions are mapped across the different types of symbols in the at least one slot; and the processing comprises partial transmission or reception of the physical channel in the at least one slot based on a transition between the different types of symbols and still counting the at least one slot as a repetition.

In some aspects, time resources of the at least one of the repetitions are mapped across only same types of symbols in the at least one slot; and the processing comprises considering the at least one slot as available for processing a repetition on the physical channel in the at least one slot and counting the at least one slot as a repetition.

In some aspects, time resources of the at least one of the repetitions are mapped across only same types of symbols in the at least one slot; and the processing comprises considering the at least one slot as unavailable for processing a repetition on the physical channel in the at least one slot.

Figure 14:
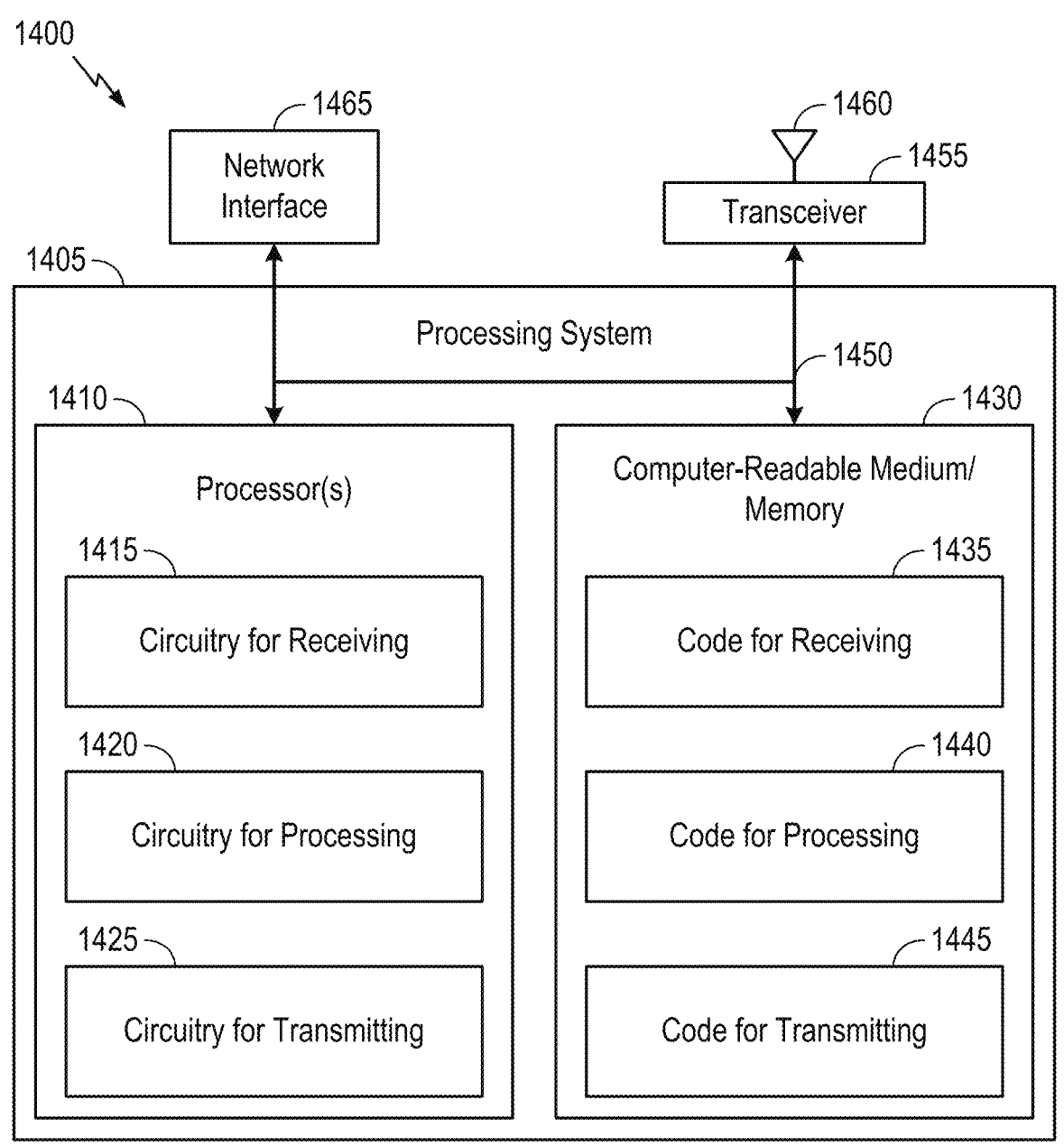
FIG. 14 depicts aspects of an example communications device.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Figure 13:
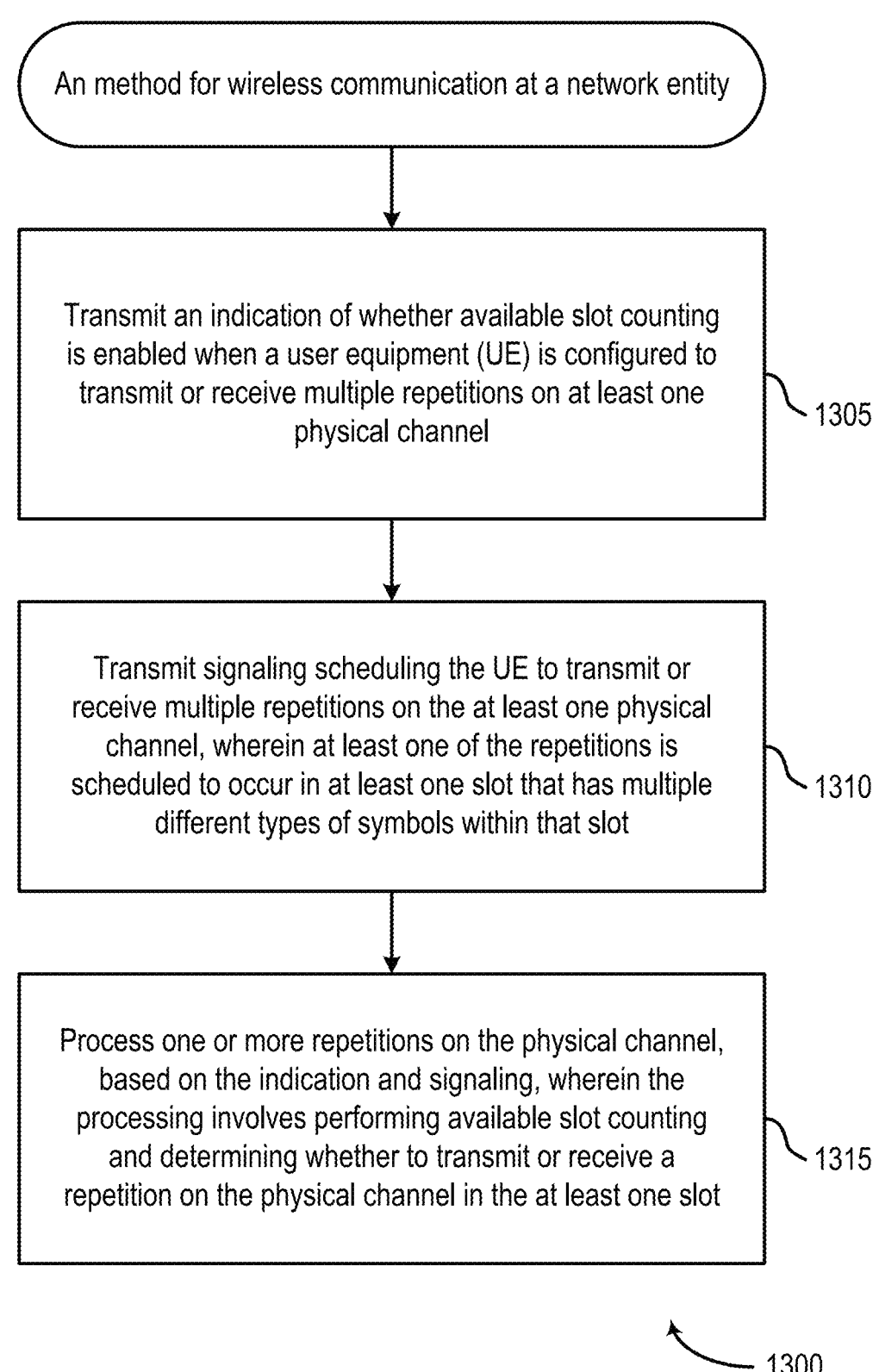
FIG. 13 depicts a method for wireless communications.

FIG. 13 shows an example of a method 1300 of wireless communication at a network entity, such as a BS 102 of FIGS. 1 and 3, or a disaggregated base station as discussed with respect to FIG. 2.

Method 1300 begins at step 1305 with transmitting an indication of whether available slot counting is enabled when a user equipment (UE) is configured to transmit or receive multiple repetitions on at least one physical channel. In some cases, the operations of this step refer to, or may be performed by, circuitry for transmitting and/or code for transmitting as described with reference to FIG. 14.

Method 1300 then proceeds to step 1310 with transmitting signaling scheduling the UE to transmit or receive multiple repetitions on the at least one physical channel, wherein at least one of the repetitions is scheduled to occur in at least one slot that has multiple different types of symbols within that slot. In some cases, the operations of this step refer to, or may be performed by, circuitry for transmitting and/or code for transmitting as described with reference to FIG. 14.

Method 1300 then proceeds to step 1315 with processing one or more repetitions on the physical channel, based on the indication and signaling, wherein the processing involves performing available slot counting and determining whether to transmit or receive a repetition on the physical channel in the at least one slot. In some cases, the operations of this step refer to, or may be performed by, circuitry for processing and/or code for processing as described with reference to FIG. 14.

In some aspects, the processing comprises: receiving one or more repetitions on an uplink physical channel; or transmitting one or more repetitions on a downlink physical channel.

In some aspects, the different types of symbols in the at least one slot include a subband full duplex (SBFD) symbol and a non-SBFD symbol.

In some aspects, the signaling indicates that available slot counting is enabled; and time resources of the at least one of the repetitions are mapped across the different types of symbols in the at least one slot.

In some aspects, the processing comprises: considering the at least one slot as unavailable for processing a repetition on the physical channel in the at least one slot; or considering the at least one slot as available for processing a repetition on the physical channel in the at least one slot and counting the slot as a repetition, without transmitting or receiving a repetition on the physical channel in the at least one slot.

In some aspects, the processing comprises considering the at least one slot as available for processing a repetition on the physical channel in the at least one slot and counting the at least one slot as a repetition if one or more conditions are met.

In some aspects, the one or more conditions involve at least one of: maintaining at least one of phase continuity, transmit power, frequency resources, timing, spatial filtering, or quasi co-location (QCL) parameters across the different types of symbols; or lack of a guard symbol period across the different types of symbols.

In some aspects, the processing comprises considering the at least one slot as unavailable for processing a repetition on the physical channel in the at least one slot if one or more conditions are met.

In some aspects, the one or more conditions involve at least one of: variation of at least one of phase continuity or transmit power across the different types of symbols; occurrence of a guard symbol period across the different types of symbols; intra-slot frequency hopping; or signaling indicating the slot is unavailable for processing a repetition.

In some aspects, the processing comprises considering the at least one slot as available for processing a repetition, but not transmitting or receiving at least a portion of a repetition on the physical channel in the at least one slot, if one or more conditions are met.

In one aspect, method 1300, or any aspect related to it, may be performed by an apparatus, such as communications device 1400 of FIG. 14, which includes various components operable, configured, or adapted to perform the method 1300. Communications device 1400 is described below in further detail.

Note that FIG. 13 is just one example of a method, and other methods including fewer, additional, or alternative steps are possible consistent with this disclosure.

Example Communications Device(s)

FIG. 14 depicts aspects of an example communications device 1400. In some aspects, communications device 1400 is a user equipment, such as UE 104 described above with respect to FIGS. 1 and 3. In some aspects, communications device 1400 is a network entity, such as BS 102 of FIGS. 1 and 3, or a disaggregated base station as discussed with respect to FIG. 2.

The communications device 1400 includes a processing system 1405 coupled to the transceiver 1455 (e.g., a transmitter and/or a receiver). In some aspects (e.g., when communications device 1400 is a network entity), processing system 1405 may be coupled to a network interface 1465 that is configured to obtain and send signals for the communications device 1400 via communication link(s), such as a backhaul link, midhaul link, and/or fronthaul link as described herein, such as with respect to FIG. 2. The transceiver 1455 is configured to transmit and receive signals for the communications device 1400 via the antenna 1460, such as the various signals as described herein. The processing system 1405 may be configured to perform processing functions for the communications device 1400, including processing signals received and/or to be transmitted by the communications device 1400.

The processing system 1405 includes one or more processors 1410. In various aspects, the one or more processors 1410 may be representative of one or more of receive processor 358, transmit processor 364, TX MIMO processor 366, and/or controller/processor 380, as described with respect to FIG. 3. In various aspects, one or more processors 1410 may be representative of one or more of receive processor 338, transmit processor 320, TX MIMO processor 330, and/or controller/processor 340, as described with respect to FIG. 3. The one or more processors 1410 are coupled to a computer-readable medium/memory 1430 via a bus 1450. In certain aspects, the computer-readable medium/memory 1430 is configured to store instructions (e.g., computer-executable code) that when executed by the one or more processors 1410, cause the one or more processors 1410 to perform the method 1200 described with respect to FIG. 12, or any aspect related to it; and the method 1300 described with respect to FIG. 13, or any aspect related to it. Note that reference to a processor performing a function of communications device 1400 may include one or more processors 1410 performing that function of communications device 1400.

In the depicted example, computer-readable medium/memory 1430 stores code (e.g., executable instructions), such as code for receiving 1435, code for processing 1440, and code for transmitting 1445. Processing of the code for receiving 1435, code for processing 1440, and code for transmitting 1445 may cause the communications device 1400 to perform the method 1200 described with respect to FIG. 12, or any aspect related to it; and the method 1300 described with respect to FIG. 13, or any aspect related to it.

The one or more processors 1410 include circuitry configured to implement (e.g., execute) the code stored in the computer-readable medium/memory 1430, including circuitry for receiving 1415, circuitry for processing 1420, and circuitry for transmitting 1425. Processing with circuitry for receiving 1415, circuitry for processing 1420, and circuitry for transmitting 1425 may cause the communications device 1400 to perform the method 1200 described with respect to FIG. 12, or any aspect related to it; and the method 1300 described with respect to FIG. 13, or any aspect related to it.

Various components of the communications device 1400 may provide means for performing the method 1200 described with respect to FIG. 12, or any aspect related to it; and the method 1300 described with respect to FIG. 13, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1455 and the antenna 1460 of the communications device 1400 in FIG. 14. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1455 and the antenna 1460 of the communications device 1400 in FIG. 14.

Example Clauses

Implementation examples are described in the following numbered clauses:

Clause 1: A method for wireless communication at a user equipment (UE), comprising: receiving an indication of whether available slot counting is enabled when the UE is configured to transmit or receive multiple repetitions on at least one physical channel; receiving signaling scheduling the UE to transmit or receive multiple repetitions on the at least one physical channel, wherein at least one of the repetitions is scheduled to occur in at least one slot that has multiple different types of symbols within that slot; and processing one or more repetitions on the physical channel, based on the indication and signaling, wherein the processing involves performing available slot counting and determining whether to transmit or receive a repetition on the physical channel in the at least one slot.

Clause 2: The method of Clause 1, wherein the processing comprises: transmitting one or more repetitions on an uplink physical channel; or receiving one or more repetitions on a downlink physical channel.

Clause 3: The method of any one of Clauses 1-2, wherein the different types of symbols in the at least one slot include a subband full duplex (SBFD) symbol and a non-SBFD symbol.

Clause 4: The method of any one of Clauses 1-3, wherein: the signaling indicates that available slot counting is enabled; and time resources of the at least one of the repetitions are mapped across the different types of symbols in the at least one slot.

Clause 5: The method of Clause 4, wherein the processing comprises: considering the at least one slot as unavailable for processing a repetition on the physical channel in the at least one slot; or considering the at least one slot as available for processing a repetition on the physical channel in the at least one slot and counting the slot as a repetition, without transmitting or receiving a repetition on the physical channel in the at least one slot.

Clause 6: The method of Clause 4, wherein the processing comprises considering the at least one slot as available for processing a repetition on the physical channel in the at least one slot and counting the at least one slot as a repetition if one or more conditions are met.

Clause 7: The method of Clause 6, wherein the one or more conditions involve at least one of: maintaining at least one of phase continuity, transmit power, frequency resources, timing, spatial filtering, or quasi co-location (QCL) parameters across the different types of symbols; or lack of a guard symbol period across the different types of symbols.

Clause 8: The method of Clause 4, wherein the processing comprises considering the at least one slot as unavailable for processing a repetition on the physical channel in the at least one slot if one or more conditions are met.

Clause 9: The method of Clause 8, wherein the one or more conditions involve at least one of: variation of at least one of phase continuity or transmit power across the different types of symbols; occurrence of a guard symbol period across the different types of symbols; intra-slot frequency hopping; or signaling indicating the slot is unavailable for processing a repetition.

Clause 10: The method of Clause 4, wherein the processing comprises considering the at least one slot as available for processing a repetition, but not transmitting or receiving at least a portion of a repetition on the physical channel in the at least one slot, if one or more conditions are met.

Clause 11: The method of Clause 10, wherein the processing comprises not transmitting or receiving symbols that occur after a transition between the different types of symbols.

Clause 12: The method of any one of Clauses 1-11, wherein: the signaling indicates that available slot counting is not enabled and repetitions are counted based on consecutive physical slot counting; time resources of the at least one of the repetitions are mapped across the different types of symbols in the at least one slot; and the processing comprises not transmitting or receiving a repetition on the physical channel in the at least one slot and counting the at least one slot as a repetition.

Clause 13: The method of any one of Clauses 1-12, wherein: the signaling indicates that available slot counting is not enabled, and repetitions are counted based on consecutive physical slot counting; time resources of the at least one of the repetitions are mapped across the different types of symbols in the at least one slot; and the processing comprises not transmitting or receiving a repetition on the physical channel in the at least one slot and not counting the at least one slot as a repetition.

Clause 14: The method of any one of Clauses 1-13, wherein: the signaling indicates that available slot counting is not enabled, and repetitions are counted based on consecutive physical slot counting; time resources of the at least one of the repetitions are mapped across the different types of symbols in the at least one slot; and the processing comprises transmitting or receiving a repetition on the physical channel in the at least one slot if some conditions are met and counting the at least one slot as a repetition.

Clause 15: The method of any one of Clauses 1-14, wherein: the signaling indicates that available slot counting is not enabled, and repetitions are counted based on consecutive physical slot counting; time resources of the at least one of the repetitions are mapped across the different types of symbols in the at least one slot; and the processing comprises not transmitting or receiving the physical channel in the at least one slot if at least one conditions is not met and still counting the at least one slot as a repetition.

Clause 16: The method of any one of Clauses 1-15, wherein: the signaling indicates that available slot counting is not enabled, and repetitions are counted based on consecutive physical slot counting; time resources of the at least one of the repetitions are mapped across the different types of symbols in the at least one slot; and the processing comprises partial transmission or reception of the physical channel in the at least one slot based on a transition between the different types of symbols and still counting the at least one slot as a repetition.

Clause 17: The method of any one of Clauses 1-16, wherein: time resources of the at least one of the repetitions are mapped across only same types of symbols in the at least one slot; and the processing comprises considering the at least one slot as available for processing a repetition on the physical channel in the at least one slot and counting the at least one slot as a repetition.

Clause 18: The method of any one of Clauses 1-17, wherein: time resources of the at least one of the repetitions are mapped across only same types of symbols in the at least one slot; and the processing comprises considering the at least one slot as unavailable for processing a repetition on the physical channel in the at least one slot.

Clause 19: An method for wireless communication at a network entity, comprising: transmitting an indication of whether available slot counting is enabled when a user equipment (UE) is configured to transmit or receive multiple repetitions on at least one physical channel; transmitting signaling scheduling the UE to transmit or receive multiple repetitions on the at least one physical channel, wherein at least one of the repetitions is scheduled to occur in at least one slot that has multiple different types of symbols within that slot; and processing one or more repetitions on the physical channel, based on the indication and signaling, wherein the processing involves performing available slot counting and determining whether to transmit or receive a repetition on the physical channel in the at least one slot.

Clause 20: The method of Clause 19, wherein the processing comprises: receiving one or more repetitions on an uplink physical channel; or transmitting one or more repetitions on a downlink physical channel.

Clause 21: The method of any one of Clauses 19-20, wherein the different types of symbols in the at least one slot include a subband full duplex (SBFD) symbol and a non-SBFD symbol.

Clause 22: The method of any one of Clauses 19-21, wherein: the signaling indicates that available slot counting is enabled; and time resources of the at least one of the repetitions are mapped across the different types of symbols in the at least one slot.

Clause 23: The method of Clause 22, wherein the processing comprises: considering the at least one slot as unavailable for processing a repetition on the physical channel in the at least one slot; or considering the at least one slot as available for processing a repetition on the physical channel in the at least one slot and counting the slot as a repetition, without transmitting or receiving a repetition on the physical channel in the at least one slot.

Clause 24: The method of Clause 22, wherein the processing comprises considering the at least one slot as available for processing a repetition on the physical channel in the at least one slot and counting the at least one slot as a repetition if one or more conditions are met.

Clause 25: The method of Clause 24, wherein the one or more conditions involve at least one of: maintaining at least one of phase continuity, transmit power, frequency resources, timing, spatial filtering, or quasi co-location (QCL) parameters across the different types of symbols; or lack of a guard symbol period across the different types of symbols.

Clause 26: The method of Clause 22, wherein the processing comprises considering the at least one slot as unavailable for processing a repetition on the physical channel in the at least one slot if one or more conditions are met.

Clause 27: The method of Clause 26, wherein the one or more conditions involve at least one of: variation of at least one of phase continuity or transmit power across the different types of symbols; occurrence of a guard symbol period across the different types of symbols; intra-slot frequency hopping; or signaling indicating the slot is unavailable for processing a repetition.

Clause 28: The method of Clause 22, wherein the processing comprises considering the at least one slot as available for processing a repetition, but not transmitting or receiving at least a portion of a repetition on the physical channel in the at least one slot, if one or more conditions are met.

Clause 29: An apparatus, comprising: a memory comprising executable instructions; and a processor configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by a processor of an apparatus, cause the apparatus to perform a method in accordance with any one of Clauses 1-28.

Clause 32: A computer program product embodied on a computer-readable storage medium comprising code for performing a method in accordance with any one of Clauses 1-28.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), comprising: memory comprising computer-executable instructions; and one or more processors configured to execute the computer-executable instructions and cause the apparatus to:

receive an indication of whether available slot counting is enabled when the UE is configured to transmit or receive multiple repetitions on at least one physical channel;

receive signaling scheduling the UE to transmit or receive multiple repetitions on the at least one physical channel, wherein at least one of the repetitions is scheduled to occur in at least one slot that has multiple different types of symbols within that slot; and process one or more repetitions on the physical channel, based on the indication and signaling, wherein the processing involves performing available slot counting and determining whether to transmit or receive a repetition on the physical channel in the at least one slot.

2. The apparatus of claim 1, wherein the processing comprises:

transmitting one or more repetitions on an uplink physical channel; or receiving one or more repetitions on a downlink physical channel.

3. The apparatus of claim 1, wherein the different types of symbols in the at least one slot include a subband full duplex (SBFD) symbol and a non-SBFD symbol.

4. The apparatus of claim 1, wherein:

the signaling indicates that available slot counting is enabled; and time resources of the at least one of the repetitions are mapped across the different types of symbols in the at least one slot.

5. The apparatus of claim 4, wherein the processing comprises:

considering the at least one slot as unavailable for processing a repetition on the physical channel in the at least one slot; or considering the at least one slot as available for processing a repetition on the physical channel in the at least one slot and counting the slot as a repetition, without transmitting or receiving a repetition on the physical channel in the at least one slot.

6. The apparatus of claim 4, wherein the processing comprises considering the at least one slot as available for processing a repetition on the physical channel in the at least one slot and counting the at least one slot as a repetition if one or more conditions are met.

7. The apparatus of claim 6, wherein the one or more conditions involve at least one of:

maintaining at least one of phase continuity, transmit power, frequency resources, timing, spatial filtering, or quasi co-location (QCL) parameters across the different types of symbols; or lack of a guard symbol period across the different types of symbols.

8. The apparatus of claim 4, wherein the processing comprises considering the at least one slot as unavailable for processing a repetition on the physical channel in the at least one slot if one or more conditions are met.

9. The apparatus of claim 8, wherein the one or more conditions involve at least one of:

variation of at least one of phase continuity or transmit power across the different types of symbols;

occurrence of a guard symbol period across the different types of symbols;

intra-slot frequency hopping; or signaling indicating the slot is unavailable for processing a repetition.

10. The apparatus of claim 4, wherein the processing comprises considering the at least one slot as available for processing a repetition, but not transmitting or receiving at least a portion of a repetition on the physical channel in the at least one slot, if one or more conditions are met.

11. The apparatus of claim 10, wherein the processing comprises not transmitting or receiving symbols that occur after a transition between the different types of symbols.

12. The apparatus of claim 1, wherein:

the signaling indicates that available slot counting is not enabled and repetitions are counted based on consecutive physical slot counting;

time resources of the at least one of the repetitions are mapped across the different types of symbols in the at least one slot; and the processing comprises not transmitting or receiving a repetition on the physical channel in the at least one slot and counting the at least one slot as a repetition.

13. The apparatus of claim 1, wherein:

the signaling indicates that available slot counting is not enabled, and repetitions are counted based on consecutive physical slot counting;

time resources of the at least one of the repetitions are mapped across the different types of symbols in the at least one slot; and the processing comprises not transmitting or receiving a repetition on the physical channel in the at least one slot and not counting the at least one slot as a repetition.

14. The apparatus of claim 1, wherein:

the signaling indicates that available slot counting is not enabled, and repetitions are counted based on consecutive physical slot counting;

time resources of the at least one of the repetitions are mapped across the different types of symbols in the at least one slot; and the processing comprises transmitting or receiving a repetition on the physical channel in the at least one slot if some conditions are met and counting the at least one slot as a repetition.

15. The apparatus of claim 1, wherein:

the signaling indicates that available slot counting is not enabled, and repetitions are counted based on consecutive physical slot counting;

time resources of the at least one of the repetitions are mapped across the different types of symbols in the at least one slot; and the processing comprises not transmitting or receiving the physical channel in the at least one slot if at least one conditions is not met and still counting the at least one slot as a repetition.

16. The apparatus of claim 1, wherein:

the signaling indicates that available slot counting is not enabled, and repetitions are counted based on consecutive physical slot counting;

time resources of the at least one of the repetitions are mapped across the different types of symbols in the at least one slot; and the processing comprises partial transmission or reception of the physical channel in the at least one slot based on a transition between the different types of symbols and still counting the at least one slot as a repetition.

17. The apparatus of claim 1, wherein:

time resources of the at least one of the repetitions are mapped across only same types of symbols in the at least one slot; and the processing comprises considering the at least one slot as available for processing a repetition on the physical channel in the at least one slot and counting the at least one slot as a repetition.

18. The apparatus of claim 1, wherein:

time resources of the at least one of the repetitions are mapped across only same types of symbols in the at least one slot; and the processing comprises considering the at least one slot as unavailable for processing a repetition on the physical channel in the at least one slot.

19. An apparatus for wireless communication at a network entity, comprising: memory comprising computer-executable instructions; and one or more processors configured to execute the computer-executable instructions and cause the apparatus to:

transmit an indication of whether available slot counting is enabled when a user equipment (UE) is configured to transmit or receive multiple repetitions on at least one physical channel;

transmit signaling scheduling the UE to transmit or receive multiple repetitions on the at least one physical channel, wherein at least one of the repetitions is scheduled to occur in at least one slot that has multiple different types of symbols within that slot; and process one or more repetitions on the physical channel, based on the indication and signaling, wherein the processing involves performing available slot counting and determining whether to transmit or receive a repetition on the physical channel in the at least one slot.

20. The apparatus of claim 19, wherein the processing comprises:

receiving one or more repetitions on an uplink physical channel; or transmitting one or more repetitions on a downlink physical channel.

21. The apparatus of claim 19, wherein the different types of symbols in the at least one slot include a subband full duplex (SBFD) symbol and a non-SBFD symbol.

22. The apparatus of claim 19, wherein:

the signaling indicates that available slot counting is enabled; and time resources of the at least one of the repetitions are mapped across the different types of symbols in the at least one slot.

23. The apparatus of claim 22, wherein the processing comprises:

considering the at least one slot as unavailable for processing a repetition on the physical channel in the at least one slot; or considering the at least one slot as available for processing a repetition on the physical channel in the at least one slot and counting the slot as a repetition, without transmitting or receiving a repetition on the physical channel in the at least one slot.

24. The apparatus of claim 22, wherein the processing comprises considering the at least one slot as available for processing a repetition on the physical channel in the at least one slot and counting the at least one slot as a repetition if one or more conditions are met.

25. The apparatus of claim 24, wherein the one or more conditions involve at least one of:

maintaining at least one of phase continuity, transmit power, frequency resources, timing, spatial filtering, or quasi co-location (QCL) parameters across the different types of symbols; or lack of a guard symbol period across the different types of symbols.

26. The apparatus of claim 22, wherein the processing comprises considering the at least one slot as unavailable for processing a repetition on the physical channel in the at least one slot if one or more conditions are met.

27. The apparatus of claim 26, wherein the one or more conditions involve at least one of:

variation of at least one of phase continuity or transmit power across the different types of symbols;

occurrence of a guard symbol period across the different types of symbols;

intra-slot frequency hopping; or signaling indicating the slot is unavailable for processing a repetition.

28. The apparatus of claim 22, wherein the processing comprises considering the at least one slot as available for processing a repetition, but not transmitting or receiving at least a portion of a repetition on the physical channel in the at least one slot, if one or more conditions are met.

29. A method for wireless communication at a user equipment (UE), comprising:

receiving an indication of whether available slot counting is enabled when the UE is configured to transmit or receive multiple repetitions on at least one physical channel;

receiving signaling scheduling the UE to transmit or receive multiple repetitions on the at least one physical channel, wherein at least one of the repetitions is scheduled to occur in at least one slot that has multiple different types of symbols within that slot; and processing one or more repetitions on the physical channel, based on the indication and signaling, wherein the processing involves performing available slot counting and determining whether to transmit or receive a repetition on the physical channel in the at least one slot.

30. A method for wireless communication at a network entity, comprising:

transmitting an indication of whether available slot counting is enabled when a user equipment (UE) is configured to transmit or receive multiple repetitions on at least one physical channel;

transmitting signaling scheduling the UE to transmit or receive multiple repetitions on the at least one physical channel, wherein at least one of the repetitions is scheduled to occur in at least one slot that has multiple different types of symbols within that slot; and processing one or more repetitions on the physical channel, based on the indication and signaling, wherein the processing involves performing available slot counting and determining whether to transmit or receive a repetition on the physical channel in the at least one slot.

* * * * *